United States Patent Office 3,365,488
Patented Jan. 23, 1968

3,365,488
PROCESS FOR PREPARING CALCIUM SORBATE
Hans Fernholz, Fischbach, Taunus, and Horst Oehme and Hans-Joachim Schmidt, Frankfurt am Main, Germany, assignors to Farbwerke Hoechst Aktiengesellschaft vormals Meister Lucius & Bruning, Frankfurt am Main, Germany, a corporation of Germany
No Drawing. Filed Dec. 8, 1964, Ser. No. 416,890
Claims priority, application Germany, Dec. 12, 1963, F 41,520
8 Claims. (Cl. 260—526)

The present invention provides a process for preparing calcium sorbate.

It is known to prepare calcium sorbate, which is an important preservative for foodstuffs by double decomposition by mixing the solutions of a soluble salt of sorbic acid, for example sodium sorbate or potassium sorbate, and of a soluble salt of calcium, for example calcium chloride or calcium acetate, in water or in alcohol, the sparingly soluble calcium sorbate being precipitated.

A process has also been described which comprises reacting sorbic acid with calcium hydroxide in an aqueous suspension with the addition of sorbic acid in excess and of a wetting agent in order to bring about a complete conversion of calcium hydroxide. Both processes have the disadvantage that the calcium sorbate prepared by them must be filtered or centrifuged and freed from impurities such as foreign salts or wetting agents, by washing. Calcium sorbate is obtained, however, in a very fine crystalline from and it adsorbs impurities and solvents very permanently so that process steps such as filtration or centrifuging and washing are very tedious and expensive. In addition the calcium sorbate prepared according to the last-mentioned process contains unreacted sorbic acid in varying amounts.

The present invention is based on the observation that pure calcium sorbate can be prepared by intimately mixing finely pulverized sorbic acid with stoichiometrical amounts of finely pulverized calcium hydroxide and/or calcium oxide.

According to the present invention the salt is formed in the absence of solvents, diluents or wetting agents.

The finely pulverized or ground initial substances generally have a median grain size of less than $70\mu$, preferably less than $50\mu$, corresponding approximately to a bulk density of sorbic acid of less than 0.5 gram/cc. and of calcium hydroxide or calcium oxide of less than 0.4 gram/cc.

The solid initial substances are intimately mixed in known manner mechanically, for example, in reaction vessels provided with stirrers or vibratory mixers, in vacuum paddle dryers or in fluidization reactors.

When carrying out the process of the present invention it is advantageous to remove the water formed during the reaction by applying a suitable subatmospheric pressure. Generally a subatmospheric pressure between 200 and 400 mm./Hg is sufficient. When using calcium oxide it is also advantageous to initiate the reaction by heating to 40° C. to 80° C. When calcium hydroxide is used it is not necessary in most cases to heat the mixture, since the reaction between the finely ground sorbic acid and the finely ground calcium hydroxide normally starts spontaneously when the reactants are thoroughly mixed. In order to achieve a complete conversion it is, however, advantageous to heat the reaction mixture to about 80° C. after the exothermic reaction has ended. This process step may be combined with drying by applying a pressure below 100 mm./Hg.

The advantages of the process according to the present invention consist in that the preparation of calcium sorbate may practically be carried out in one process stage only and that troublesome and expensive process steps for example filtration or centrifuging and washing are avoided.

The following examples serve to illustrate the invention but they are not intended to limit it thereto.

EXAMPLE 1

224 grams of finely ground sorbic acid having a bulk density of 0.42 gram/cc. and 56 grams of pulverized calcium oxide were heated to 60° C. to 70° C. under a pressure of 400 mm./Hg while stirring. A strongly exothermic reaction set in. After the reaction temperature had fallen, the mixture was further stirred for 30 minutes at 80° C. under a pressure of 20 mm./Hg in order to remove the water. There were obtained 260 grams of calcium sorbate of at least 99% strength having a bulk density of 0.34 gram/cc. The grain size was below $50\mu$.

EXAMPLE 2

224 grams of finely pulverized sorbic acid and 74 grams of calcium hydroxide were mixed under nitrogen in a flask provided with a stirrer under a pressure of 200 mm./Hg. After the exothermic reaction had slowed down the mixture was further heated to 60° C. to 70° C. for 30 minutes. There was obtained a calcium sorbate of at least 99% strength. The median grain size of the calcium sorbate was about $50\mu$.

We claim:

1. In a process for preparing calcium sorbate by reaction of sorbic acid with calcium hydroxide, calcium oxide or a mixture thereof, the improvement which comprises intimately admixing the reactants while they are in the form of finely pulverized solids having median grain sizes of less than $70\mu$.

2. A process as claimed in claim 1 wherein the grain size is less than $50\mu$.

3. A process as claimed in claim 1 wherein the reaction is carried out at a subatmospheric pressure of 200 to 400 mm./Hg.

4. A process as claimed in claim 1 wherein the reaction is initiated by heating the mixture to a temperature of from about 40° C. to about 80° C.

5. A process as claimed in claim 1 wherein the reaction is completed by heating the mixture to a temperature of from about 40° C. to about 80° C.

6. The process as defined in claim 1 wherein the reactant with sorbic acid is calcium hydroxide.

7. In a process for preparing calcium sorbate by reaction of sorbic acid with calcium hydroxide, calcium oxide or a mixture thereof, the improvement which comprises intimately admixing the reactants, at a subatmospheric pressure of 200 to 400 mm./Hg, while they are in the form of finely pulverized solids having median grain sizes of less than $70\mu$, and heating said mixture to a temperature of from about 40° C. to about 80° C. to initiate and complete the reaction.

8. The process as defined in claim 7 wherein the reactant with sorbic acid is calcium oxide.

References Cited

UNITED STATES PATENTS

| | | | |
|---|---|---|---|
| 2,833,745 | 5/1958 | Fikentscher | 260—526 |
| 3,021,364 | 2/1962 | Cornell et al. | 260—526 |
| 3,139,378 | 6/1964 | Gooding | 260—526 |

LORRAINE A. WEINBERGER, Primary Examiner.

I. R. PELLMAN, V. GARNER, Assistant Examiners.